P. DECH.
HORSESHOE ATTACHMENT.
APPLICATION FILED DEC. 18, 1912.

1,154,978.

Patented Sept. 28, 1915.

WITNESSES:
M. A. Johnson.
W. E. Norton.

INVENTOR
Peter Dech,
BY
Wm H. Campfield,
ATTORNEY

UNITED STATES PATENT OFFICE.

PETER DECH, OF WEST ORANGE, NEW JERSEY, ASSIGNOR OF ONE-HALF TO HENRY G. ROLLPILLER, OF WEST ORANGE, NEW JERSEY.

HORSESHOE ATTACHMENT.

1,154,978.   Specification of Letters Patent.   Patented Sept. 28, 1915.

Application filed December 18, 1912. Serial No. 737,363.

*To all whom it may concern:*

Be it known that I, PETER DECH, a citizen of the United States, residing at West Orange, in the county of Essex and State of New Jersey, have invented certain new and useful Improvements in Horseshoe Attachments; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

This invention relates to a horseshoe attachment which can be placed on the shoe of a horse or detached therefrom at will, the attachment being designed to provide a better gripping surface in case of slippery or icy weather. The device is one which can be placed on the shoe while the shoe is on the horse's hoof, and can be taken off and put on quickly and without much manipulation.

The invention relates to a device of this kind which has two members that are spread by a connecting means and are forced from each other in close contact with the inner edges of the horseshoe, an additional means of fastening being provided by the calks which fasten themselves and the arms to the horseshoe and act as a secondary fastening means, and also take up the difference in thickness between different shoes to which the device can be applied.

The invention is illustrated in the accompanying drawing, in which—

Figure 1:
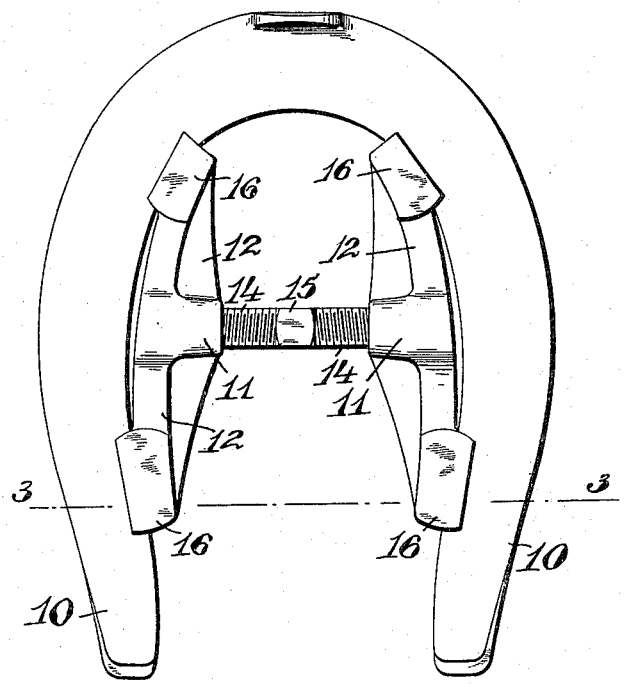
Figure 2:
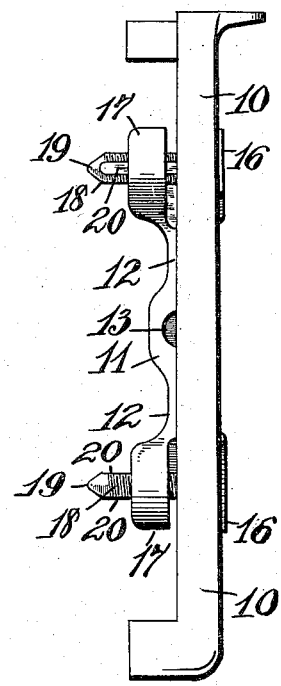
Figure 3:
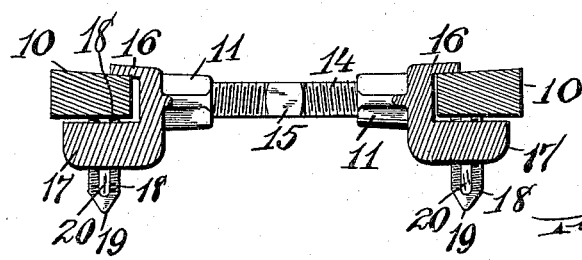

Figure 1 is a top view of a horseshoe provided with my improved attachment. Fig. 2 is a side view of Fig. 1, and Fig. 3 is a section on line 3, 3, in Fig. 1.

The device is adapted to be applied to or detached from the horseshoe 10 while the shoe is on the horse's hoof, the device consisting of two members 11, each of which is provided with arms 12 extending toward the front and rear. Each member is provided with a perforation 13 which is screw-threaded, the screw-threads in two opposed members being in opposite directions to form right and left threads. A screw 14, the ends of which are screw-threaded in opposite directions to form a right and left screw, is provided with a portion 15 that will receive a wrench, being preferably squared, the screw fitting in the perforations 13 so that when the screw is turned and the members are held against rotation they can be drawn together or forced apart. On the upper side of each member at the ends are the lips 16 and on the under side of the arms and at the ends are the lugs 17, the lips being thin so that they can be forced in between the upper side of the horseshoe at its inner edge and the hoof. Each lug is screw-threaded, and calks 18 are screwed through the lugs and against the under face of the shoe to take up space between the shoe and the lug and also assist in clamping the members to the shoe. The calks are preferably pointed as at 19 and provided with flattened faces 20 to provide for surfaces that can be grasped by a wrench. The calks are screwed in place and act to hold the members so that any tendency to work loose by the members is resisted, and they make it difficult for the screw 14 to turn to pull the members toward each other. In addition thereto, it will be noted that the screw 14 and its squared portion 15 are close up to the upper side of the shoe and are adapted to rest partly against the frog of the hoof so that the accidental turning of the screw is not likely.

The outer faces of the members are curved in substantially the same direction as the inner face of the horseshoe, but at a larger radius so that the members engage the horseshoe at the ends of the members, thus providing for a slight spring action in the members. This spring action is sufficient to permit a constant spring pressure on the screw 14 so that after the screw has been tightened into place and the members have been given the necessary spring, the spring pressure of the members binds or locks the screw against accidental rotation and does not make it essential to use lock-nuts. The attachment is substantially flat and does not project unduly away from the shoe toward the ground, except at the places where it should engage the ground, that is at the lugs.

Having thus described my invention, what I claim is:—

A horseshoe attachment comprising two members, each member consisting of one piece with lips at the ends of its upper outer edge and lugs at the ends of its lower outer edge, the outer edge between the ends being convex and adapted to lie opposite the inner concave edge of the horseshoe, the outer edge of the member being of slightly larger radius than the inner edge of the shoe to permit a limited spring of the member, each member having a substantially central screw-threaded perforation, and a screw to fit in the perforations and having a portion to be engaged by a tool whereby the screw can be operated to force the members to their sprung positions and to lock the screw against turning by the friction of the resistance of the members to the springing force.

In testimony, that I claim the foregoing, I have hereunto set my hand this 4th day of December, 1912.

PETER DECH.

Witnesses:
HENRY G. ROLLPILLER,
WM. H. CAMFIELD.

Copies of this patent may be obtained for five cents each, by addressing the "Commissioner of Patents, Washington, D. C."